Jan. 2, 1951     E. HOFFMANN     2,536,848

MOVABLE OUTLET FOR FLUIDS

Filed Oct. 8, 1945

ERNEST HOFFMANN,
INVENTOR.

BY: Julian J. Wittel his ATTORNEY.

Patented Jan. 2, 1951

2,536,848

UNITED STATES PATENT OFFICE 2,536,848

MOVABLE OUTLET FOR FLUIDS

Ernest Hoffmann, New York, N. Y.

Application October 8, 1945, Serial No. 620,881

2 Claims. (Cl. 222—537)

This invention relates to tapping means for fluid mediums, like water, oil, and gases, and has for its main object to provide means whereby a source of such fluid may be tapped, or outlet allowed for the same, by a movable device at various predetermined positions.

Another object of this invention is to provide tapping or outlet means, as characterized hereinbefore, which will be adapted to conveniently and easily be moved into any position within a predetermined limit, all the time providing an outlet for the fluid medium originating in a source or in a reservoir thereof, and all the time keeping said fluid medium in a safely sealed condition, allowing no other escape for the same than through the device of this invention.

Further objects of the invention will be apparent as the specification of the same proceeds or will partly be pointed out therein.

In the drawings forming a part of this specification and accompanying the same:

Fig. 1 shows in a diagrammatic plan view, a container or reservoir of a fluid medium to which my invention has been applied, while

Figure 1:
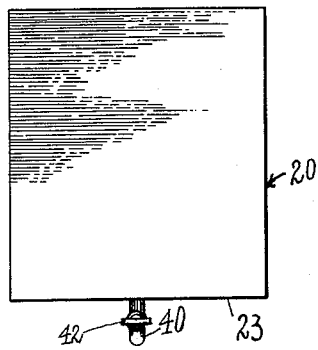
Figure 4:
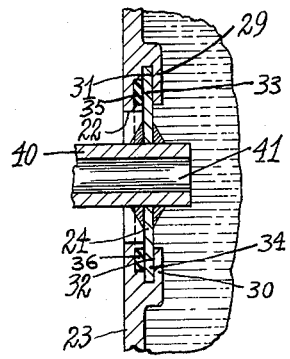
Fig. 4 is a sectional fragmentary detail on the line 4—4 of Fig. 2.
Figure 2:
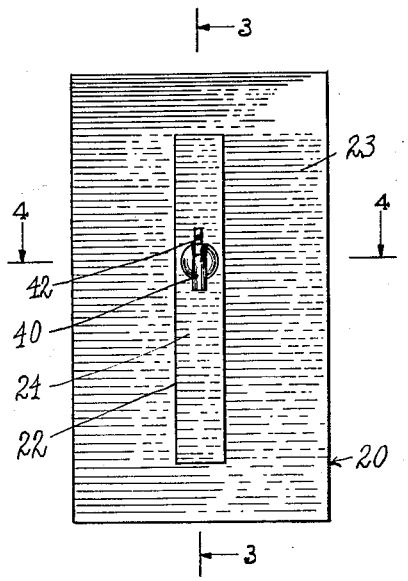
Fig. 2 is a front elevational view thereof.
Figure 3:
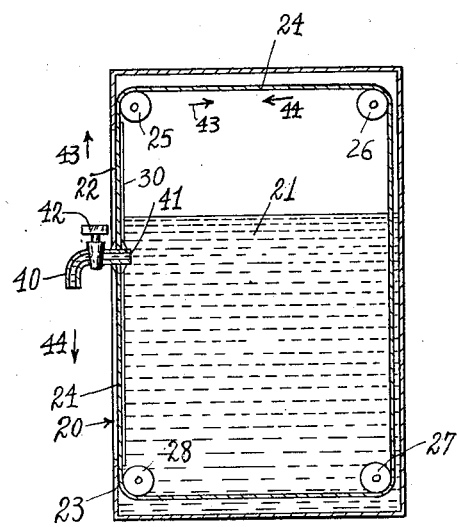
Fig. 3 is a sectional view of the same, the section being taken on the line 3—3 of Fig. 2.

Referring now to the drawings, more in detail, by characters of reference, the numeral 20 indicates a reservoir of any appropriate fluid medium, in general, the fluid being indicated at 21, as a liquid, like oil or water, but, of course, it may be a gas or any other appropriate fluid medium, as has been indicated hereinbefore.

An opening 22 is provided in the front wall 23 of the reservoir 20, and a flexible belt like medium 24 is applied to the rear thereof within the reservoir 20, means being provided that said flexible band 24 should sealingly close the opening 22.

In the embodiment shown, the flexible belt 24 is shown as an endless one, and it is arranged over the four pulleys 25, 26, 27, 28, so that it can roll over them, as will be understood.

Guide or sealing flanges 29 and 30 may be arranged at the two sides of the opening 22, and in the spaces 31 and 32 between said flanges and the front wall 23 of the fluid reservoir, the outer margins 33 and 34 of the flexible band 24 may ride in a tight sealing but slidable manner.

To improve the sealing action at the longitudinal margins of the belt 24, sealing packings 35 and 36 may also be employed. Such flexible but fluid and pressure tight belts are well known in this art. They may simply be a flexible band of metal, rubber, or treated fabric, or they may be specific flexible tight sealing constructions similar to those used in flexible tubes, some of which may be exposed to high fluid pressure and still stand up in practice, as it is well known.

The drawings show such an arrangement in a semi-diagrammatic manner, and it is understood that the sealing margins 33 and 34 of the flexible band 24 may be specifically made, like of highly polished metal running on the highly polished inner surfaces of the spaces 31 and 32 under the flanges 29 and 30, respectively. An outlet pipe 40 may be secured into the flexible belt 24 at an appropriate desired place thereon, adapted to be moved up and down within the opening 22 in the wall of the reservoir, said tube communicating with the inside of the reservoir, as at 41, and having any appropriate valve means 42 therein whereby normally the outflow of the fluid 21 from the reservoir will be prevented.

The use and operation of my invention will be apparent from the description thereof, but I want to further remark: When it is desired to tap the liquid 21 within the reservoir 20 at a predetermined position, the tapping tube 40 will be moved upwardly or downwardly, as indicated by the arrows 43 and 44, respectively, by moving the endless belt around the pulleys 25 to 28 in the same respective directions. When the outlet pipe 40 is in the desired position, valve 42 may be opened and the fluid 21 may flow out down to the level to which pipe 40 was set.

In this manner the reservoir may be tapped at any level thereof, which is very desirable in many industrial processes.

My invention may also be applied in an obvious manner to a pipe or tube of liquid, even if under high pressure, and within a certain limit along the length of said tube or pipe an outlet may be provided in any position and at any time.

While I have shown a preferred embodiment of my invention, it is to be understood that changes and variations may be resorted to in the elements, construction and combination of my invention, and I reserve my rights to such changes and variations, as are within the spirit of this specification, and the scope of the claims hereunto appended:

What I claim as new and want to protect by Letters Latent of the United States, is:

1. A movable outlet for a reservoir of a fluid medium, comprising a container for said medium having an opening of predetermined location and length in one of its walls, a member sealingly closing said opening but being movable therealong, and an outlet device for the fluid medium carried by said movable member, said member being in the form of an endless belt running over rollers and permitting a movement of said outlet to any position lengthwise of said opening in the wall of the container.

2. An outlet for a container having an elongated vertical opening in one of its sides including a belt behind the opening and covering it and slidable along it, a valved outlet device carried by the belt and projecting through the opening, flanges overlying the edges of the belt, and sealing packings carried by the flanges and bearing against the belt to hold it against sideways leakage.

ERNEST HOFFMANN.

REFERENCES CITED

The following references are of record in the file of this patent:

UNITED STATES PATENTS

| Number | Name | Date |
| --- | --- | --- |
| 36,478 | Phelps | Sept. 16, 1862 |
| 1,578,418 | Gannon | Mar. 30, 1926 |
| 1,889,978 | Dickey | Dec. 6, 1932 |
| 2,117,480 | Harvey | May 17, 1938 |